United States Patent Office 2,758,856
Patented Aug. 14, 1956

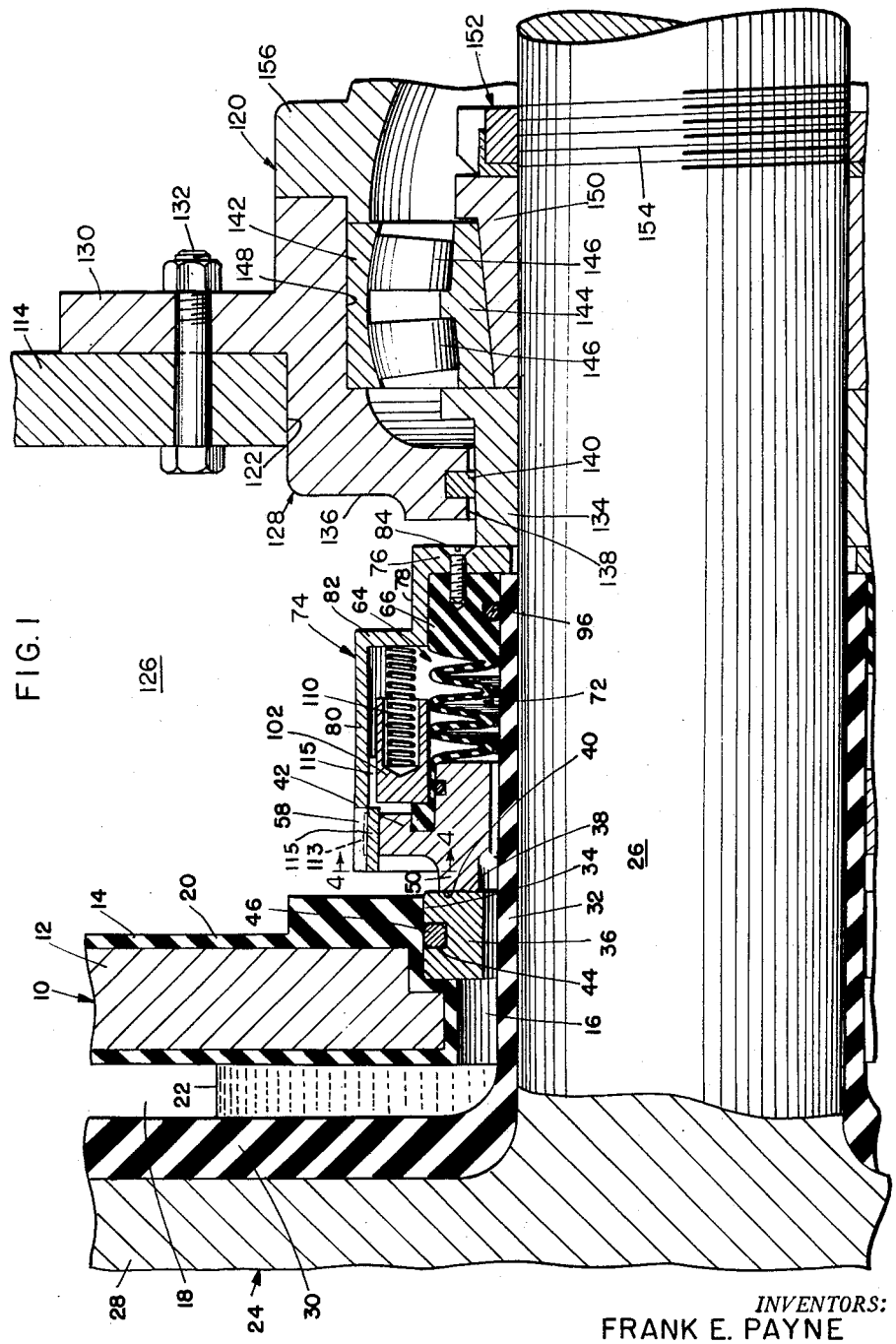

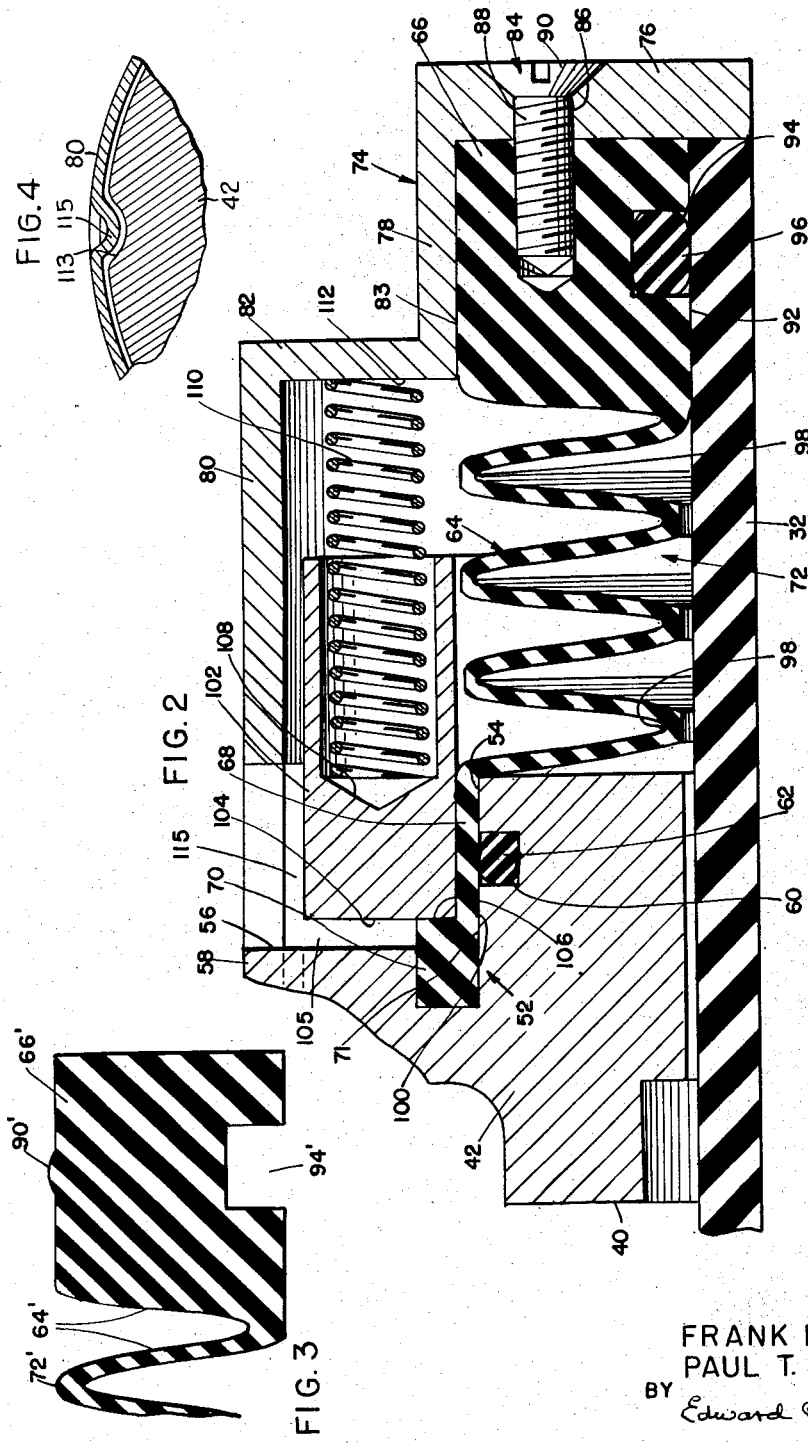

2,758,856

ROTARY MECHANICAL SEAL

Frank E. Payne, Glencoe, and Paul T. Haake, Park Ridge, Ill., assignors to Crane Packing Company, Chicago, Ill., a corporation of Illinois Application June 9, 1953, Serial No. 360,504

5 Claims. (Cl. 286—11)

The present invention relates to rotary mechanical seals and more particularly to an improved seal suitable for use in connection with the submerged roll tanks utilized in electrolytic plating equipment for the continuous application of tin or other metal to sheets or strips of steel stock. The invention, however, is capable of other uses and the present improved seal may, if desired, with or without modification, be employed for preventing the leakage of a fluid along a rotating shaft, regardless of the specific installation with which the shaft may be associated.

In electrolytic plating equipment of the character mentioned above, considerable difficulty has been encountered in sealing the openings provided in the walls of the plating tanks where the supporting shafts for the submerged rolls pass through these walls. Due to the corrosive nature of the liquid contained within the tank, and also due to the relatively high temperatures involved, conventional seals, particularly the metal parts thereof which are exposed to the corrosive fluid, are subject to attack and rapid deterioration. Additionally, where mechanical seals employing flexible diaphragms are employed, the diaphragm itself is subject to the deleterious action of the acid so that ultimate decomposition or softening thereof will take place. Another limitation that is attendant upon the use of present day seals in connection with plating tank installations resides in the inability of the seal to withstand the relatively large amount of axial expansion of the submerged rolls that ordinarily takes place or to withstand lateral shifting of the tank walls. Such axial expansion and lateral shifting of these parts establishes a degree of relative axial movement between the rotating and non-rotating seal parts which destroys the effectiveness of the seal. This is especially true in the case of conventional seals employing a fixed sealing seat and a cooperating rotary sealing washer yieldingly pressed into engagement with the seat and providing opposed lapped frictional sealing surfaces between them. In such an instance, relative shifting between the seal parts in one direction may serve to destroy the sealing pressure between the washer and seat to such an extent that the surfaces are no longer effective to prevent passage of fluid therebetween. On the other hand, relative shifting movement between the seal parts in the other direction may increase the pressure existing between the washer and seat abnormally and to such an extent that destructive wearing force is encountered tending rapidly to wear the sealing faces.

The present invention is designed to overcome the above noted limitations that are attendant upon the use of conventional seals for plating equipment of this character, and toward this end, it is among the principal objects of the present invention to provide a seal which is located wholly outside of the submersion tank so that the various parts thereof are, in the main, kept out of contact with the corrosive liquid employed within the tank.

It is another object of the invention to provide a seal of this character having one end thereof anchored to the shaft outside of the tank and having its other end disposed in the tank wall around the opening provided therein so that upon either axial expansion of the submersion roller and consequent shifting of its supporting shaft, or lateral shifting of the tank wall relative motion between the seal parts will automatically be compensated for.

A still further object of the invention is to provide an efficient seal of this character for use in connection with corrosive fluids in which the various metal parts thereof are formed of anti-corrosive material and in which the flexible sealing element thereof is likewise formed of a non-corrosive material which is not affected by the corrosive fluid throughout a wide range of temperature conditions.

A similar and related object of the invention is to provide a seal in which many of the metal parts thereof are maintained out of contact with the corrosive liquid during normal operation of the seal.

Yet another object of the invention is to provide a seal of this character which is particularly designed for use in connection with rubber coated submersion rolls, supporting shafts and tank walls, and which employs resilient sealing elements in contact with these parts, the sealing elements being at all times static so that there is no shifting movement thereof which, in time, would ultimately destroy the efficacy thereof.

Another object of the invention is to provide a seal including relatively movable cooperating sealing members, together with means whereby one of the members may be uniformly and yieldingly loaded against the other member to insure a more equal disposition of sealing pressure between the opposed sealing surfaces of the two members.

A still further object of the invention is to provide a rotary mechanical seal of the character briefly set forth above employing a flexible bellows member which surrounds the rotary roller-supporting shaft and in which the bellows element closely surrounds the shaft but is incapable of binding thereagainst.

An additional object of the invention is to provide a mechanical seal of this sort including a fixed sealing seat and a rotatable sealing washer, together with a flexible bellows member by means of which the washer is effectively sealed to the shaft and in which both the seat and washer may be replaced without necessitating replacement of the bellows member or removal of the latter from its position within the seal assembly.

The provision of a seal which is relatively simple in its construction; one which is comprised of a minimum number of relatively moving parts and which, therefore, is unlikely to get out of order; one which is rugged and durable and which, therefore, may be subjected to hard usage; one which is possessed of an extremely long life; and one which is otherwise well adapted to perform the services required of it, are further desirable features that have been borne in mind in the production and development of the present invention.

In the accompanying two sheets of drawings forming a part of this specification, a preferred embodiment of the invention has been shown.

Fig. 1 is a longitudinal sectional view taken substantially centrally and axially through an assembled seal construction manufactured in accordance with the principles of the present invention and showing the seal operatively applied to a submerged roll plating tank installation.

Fig. 2 is an enlarged detail longitudinal sectional view taken through a portion of the seal assembly.

Fig. 3 is a fragmentary sectional view taken through one end of a bellows member employed in connection with a modified form of the present invention and showing the bellows member in its free state, and Fig. 4 is a sectional view token substantially along the line 4—4 of Fig. 1.

In all of the above described views, similar characters of references are employed to designate similar parts throughout.

Referring now to the drawings in detail, the improved seal of the present invention is shown as being operatively associated with a continuous plating installation of the type utilizing a series of plating tanks, each of which has associated therewith a submerged roll. Such installations may vary widely in their construction according to the particular process involved but in general these installations include a series of spaced plating tanks arranged linearly in a row. The sheet metal or strip stock undergoing plating is passed beneath the submerged roll of the first tank in the series and from thence it passes upwardly over an idler roll after which it again passes downwardly beneath the submerged roll of the second tank. The sheet stock thus follows a serpentine path of movement and is carried successively beneath as many submerged rolls as there are plating baths in the process. As stated above, these installations may vary widely in their character, but a typical installation may employ three separate plating tanks with a 25% sulphuric acid solution in the first tank at ambient temperature, a 25% to 35% sulphonic acid solution at 125° F. in the second tank and a 5% caustic potash solution at 200° F. in the third tank. The seal of the present invention is designed to accommodate sealing of the shaft opening in any of the above mentioned instances as well as being usable in various other types of installations.

Referring now to Fig. 1, one of the end walls of a conventional plating tank is fragmentarily shown and is designated at 10. The plating tank itself has not been disclosed herein, but it will be understood that the same consists of an open top vat-like structure of a length slightly greater than the width of the continuous metal sheet or strip undergoing plating and having opposed side walls, a curved bottom and two opposed end walls, the wall 10 being one of the latter. The walls, including the wall 10, are preferably rubber-covered and, accordingly, the wall 10 is shown as being in the form of a metal plate 12 which is entirely surrounded by a coating of hard rubber 14 or rubber substitute. The wall 10 is formed with a shaft opening 16 extending therethrough and the rubber material 14 extends completely across the opening 16 so that no portion of the metal plate 12 is exposed.

The liquid side of the tank wall 10 is designated at 18 and the side which is exposed to atmosphere is shown at 20. The liquid level in the tank may vary and a purely arbitrary liquid level has been shown by the dotted line 22. A submersion roller is fragmentarily shown at 24. These rollers usually are in the form of hollow drums which are integrally formed with their supporting shafts, one of which is shown herein at 26. The drum walls 28 are completely covered by a relatively thick layer 30 of hard rubber or rubber substitute, which layer merges with a relatively thin covering or sleeve 32 which surrounds and closely adheres to cylindrical surface of the shaft 26 and projects outwardly from the end of the drum a short distance so that the sleeve projects completely through the opening 16.

The diameter of the opening 16 is appreciably greater than the overall diameter of the shaft 26 and encompassing hard rubber sleeve 32. The opening 16 is provided with a counterbore 34 in which there is tightly fitted a seal seat member 36 in the form of a continuous ceramic ring presenting an outwardly facing lapped sealing surface 38 designed for sealing engagement with a cooperating lapped sealing surface 40 provided on a sealing washer 42 associated with the present seal assembly and the nature of which will be made clear presently. The seat member 36 is provided with an external peripheral groove 44 in which there is disposed a continuous sealing element 46 which is preferably in the form of a conventional O-ring. As will be pointed out, this O-ring 46 is static and thus is not subject to torsional or other stresses when the seal is in use. As shown, the ring 46 is distorted and under considerable pressure when the seat member 36 is installed within the opening 16.

The sealing washer 42 is telescopically received over the sleeve 32 and shaft 26 and is provided with a forwardly extending rib or nose piece 50 on which the previously mentioned lapped sealing surface 38 is formed. The washer 42 is formed with a rearwardly facing recess 52 (Fig. 2) providing a cylindrical surface 54 and a rearwardly disposed shoulder 56. The annular recess 52 in effect provides a radially extending annular flange 58 medially of the washer. An annular trough or recess 60 is formed in the cylindrical surface 54 of the washer and it is adapted to receive therein a resilient sealing member in the form of an O-ring 62, the purpose and function of which will become clear as the following description ensues.

The washer 42 described above is preferably made of a thermosetting resin containing a powdered alloy of antimony, tin and lead and it has been found that washers of such material are highly effective when operating against the ceramic material of the seat member 36. It will be understood, however, that the material of both the seat member and the washer may be varied to suit the particular requirements of the installations in which the present seal is used.

The washer 42 is sealed to the extreme rear end of the hard rubber sleeve 32 by means of a flexible bellows member designated in its entirety at 64. For plating installations of the character illustrated herein, the flexible bellows member 64 is preferably made of a polytetrafluorethylene polymer which is manufactured as described in Industrial and Engineering Chemistry, vol. 38, page 870, September 1946 and is sold by E. I. DuPont de Nemours under the trade name "Teflon." This material is characterized by its chemical inertness which is characteristic from extremely low temperatures up to 572° F. Through this temperature range it resists the attack of corrosive reagents and dissolution by solvents. Molded Teflon is a tough, waxy solid, white to gray in color and is highly resistant to abrasion. This material can be held at elevated temperatures over long periods of time without change. Thus for a seal of the character set forth herein, the Teflon bellows element is highly effective. The flexible bellows member 64 is preferably machined by a special process which forms no part of this invention from a solid tubular piece of Teflon stock inasmuch as the material known as Teflon is not readily susceptible to molding operations of the character necessary to produce the desired shape. The bellows 64 involves in its general organization a relatively thick cylindrical part 66 at one open end thereof, a cylindrical part 68 adjacent the other open end, an outwardly and radially extending thickened flange portion 70 at this latter end of the bellows, and an intermediate undulatory bellows section proper 72 extending between the cylindrical parts 66 and 68. The radially extending thickened portion 70 of the bellows member 64 is received in a circular groove 71 provided in the rear face 56 of the sealing washer 42. The width of the thickened portion 70 is somewhat in excess of the depth of the groove 71 for purposes that will be made clear presently.

A generally cup-shaped retainer 74 is telescopically received over the bellows member 64 and includes an end wall having a circular end flange 76, a forwardly offset flange 82 and an interconnecting cylindrical wall 78 of reduced diameter. A cylindrical wall 80 of larger diameter projects forwardly from the offset flange 82. The cylindrical wall 78 fits closely against the outer cylindrical surface 83 of the part 66 and is substantially coextensive with the axial extent of this latter part. An anchoring screw 84 extends through an opening 86 provided in the end flange 76 and has its shank 88 threadedly received in the body of the part 66. The head 90 of the screw 84 is countersunk in the flange 76 as shown.

The inner cylindrical face 92 of the relatively thick part 66 of the bellows member 64 is formed with an internal annular groove 94 adapted to receive therein a sealing member in the form of an O-ring 96 which is compressed within the groove between the part 66 and the outer cylindrical surface of the hard rubber sleeve 32.

The bellows portion proper 72 of the bellows member 64 consists of a plurality of undulatory folds 98 of the Teflon material. While six such folds have been illustrated in the drawings, it will be understood that a greater or lesser number of folds may be employed and that the particular number of folds utilized will be dictated according to the engineering exigencies associated with the particular installation to which the seal of the present invention is applied. The foremost fold 98 in the series of folds merges with the cylindrical part 68 and the latter part is telescopically received over the cylindrical portion 54 of the washer 42. The cylindrical part 68 itself merges with the radial flange 70 and this latter flange bears against the rearwardly facing radial surface 56 of the washer 42.

It is to be noted at this point that the resilient O-ring 62 which is disposed in the annular groove 60 provided in the cylindrical surface 54 of the washer 42 is compressed against the inner cylindrical surface 100 of the cylindrical portion 68 of the bellows 64 so that this O-ring effectively seals the washer to the cylindrical portion 68 against axial passage of liquid therealong.

A clamping ring or sleeve 102 encircles the cylindrical portion 68 of the bellows 64 and also encircles a portion of the bellows proper 72 and has an internal diameter of such extent that when the sleeve is telescopically received over the cylindrical surface 54 of the washer 42, the cylindrical portion 68 of the bellows will be clamped between the washer and the sleeve. The forward face 104 of the sleeve 102 bears against the forward face 106 of the flange portion 70. Because of the fact that the thickened portion 70 of the bellows 64 is wider than the depth of the groove 71, a clearance exists at 105 between the forward face 104 of the clamping ring 102 and the shoulder 56. A series of longitudinally extending holes or sockets 108 are drilled in the clamping sleeve 102 and are equidistantly spaced around the sleeve. Each socket 108 is adapted to receive therein one end of a compression spring 110 and the other end of each spring is adapted to bear against the inner forward face 112 of the radially extending retainer flange 82. The various springs 110 serve to normally urge the sleeve member 102 forwardly against the flange 70 of the bellows 64 which, in turn, urges the washer 42 forwardly in the seal assembly so that the sealing face 40 thereof is yieldingly pressed into sealing engagement with its mating sealing surface 38 provided on the ceramic seat 36. Any desired number of springs 110 may be employed and the various springs are equally spaced from their adjacent springs so that uniform sealing pressure around the circular sealing faces 38 and 40 is at all times preserved.

As shown in Fig. 1, the sealing washer 42 is provided with a series of longitudinally extending peripheral notches 113 and a series of indentations 115 are struck inwardly from the cylindrical portion 80 of the retainer 74 adjacent the forward rim thereof and interlocked with the notches 113 to effect a driving connection between the retainer and washer so that the rotary movement of the shaft 26 is transmitted from the former to the latter.

The shaft 26 is supported exteriorly of the plating tank by a tapered roller bearing assembly designated in its entirety at 120 and carried in an opening 122 provided in a bell housing, a fragment of which has been shown at 114. The bell housing 114 is suitably supported from the tank wall 10 and is open at its top but closed at its sides and bottom, thus forming a drain pocket 126 in which the seal assembly of the present invention is disposed.

The roller bearing assembly includes a bearing housing 128 having a radial flange 130 secured to the bell housing 114 by clamping bolt assemblies 132. The bearing housing 128 projects through the opening 122. A sleeve 134 surrounds the shaft 26 and has its forward end bearing against the retainer end flange 76. The forward wall 136 of the housing 128 is provided with an opening 138 extending therethrough and through which the sleeve 134 projects. The sleeve 134 and wall 136 are sealed by means of a suitable packing gland 140. The roller bearing proper includes an outer race 142, an inner race 144 and a series of rollers 146 therebetween. The outer race 142 fits within a machined cylindrical inner surface 148 provided in the housing 128 and the inner race 144 is carried by a wedge member 150 in the form of a sleeve which is axially slidable on the shaft 26. A lock nut assembly 152 is received on a threaded portion 154 of the shaft 26 and is adapted to be tightened against the wedge member 150 so that the latter is clamped against the sleeve 134 which in turn bears against the end flange 76 of the retainer 74 and serves to firmly clamp the retainer between the rear end of the shaft sleeve 32 and the front face of the sleeve 134 so that the retainer will be driven with the shaft 26. A bearing cap or grease retainer 156 is secured to the bearing housing 128 by means of studs (not shown).

As previously stated, the stationary seat member or ring 36 is preferably formed of a ceramic material such as Steatite while the washer 42 is formed of a thermosetting resin containing a powdered alloy of antimony, tin and lead. The metal parts of the seal including the pressure plate or ring 102, the springs 110, the retainer casing 74, and the anchoring screw 84 are preferably formed of Monel metal due to the resistance of this latter material to the corrosive effects of acid. While the corrosive liquid contained within the plating tank is effectively sealed against passage along the sealing surfaces 38 and 40 and through the ends of the bellows 64 so that contamination of the metal parts of the seal assembly is unlikely, these parts are made of Monel metal to guard against the possibility of splash in the event of seal failure.

It is to be noted that the effective accumulative extent of flexing of the bellows folds 98 is comparatively great so that relatively large increments of shifting movement of the washer 42 axially along the shaft relative to the retainer casing 74 is made possible. The provision for large axial displacement of the washer 42 is necessary by virtue of the degree of expansion encountered by the submerged roller 24 in actual operation. Furthermore, the opposed tank walls 10 are subject to considerable lateral shifting movement bodily so that the accumulative displacement of the seal seat member 36 relative to a given point on the surface of the shaft 26 may be extremely large. Although the bellows folds 98 are subject to slight radial elongation during flexing thereof, the inner diameter of the folds is of an extent sufficiently in excess of the overall diameter of the shaft 26 including its hard rubber casing or sleeve 32 so that at no time during operation of the seal will the crests of these folds bind against the sleeve 32.

While the various bellows folds 72 have been illustrated herein as being in the form of individual interconnected folds, each having its own medial, radial plane, it is within the contemplated scope of the present invention to form the bellows member 64 with angular extending folds which are continuous and which form a helix of suitable pitch extending from the thickened part 66 to the cylindrical part 68. Regardless, however, of the specific form of the bellows portion of the flexible member 64, the essential features of the invention will at all times be preserved.

It is also to be noted that the maximum overall diameter of the seal assembly is less than the diameter of the opening 122 provided in the supporting wall 124. Thus the seal may be readily assembled on the shaft 26 in its proper operative relation with respect to the seat 36 by axial insertion thereof through the wall opening 122. Furthermore, in the event that the seat member 36 or the washer 42, or both of these sealing elements, requires replacement, it is a comparatively easy matter to replace the same by unfastening the bolt assemblies 132 so that the tapered roller bearing assembly 120 and retainer 74, together with its contained elements, may be slid from the end of the shaft 26 whereupon both the seat member 36 and washer 42 are accessible.

In Fig. 3 there is shown a slightly modified form of bellows 64' capable of use in connection with the seal assembly of Fig. 2. When this form of bellows member is employed, the anchoring screw 84 may be dispensed with and the driving connection between the thickened portion 66' of the bellows member and the retainer is effected by compressing the thickened portion between the shaft 26 and the reduced cylindrical wall 78 of the retainer. An annular rib 90' is formed on the periphery of the thickened portion 66' to further enhance the frictional engagement between the material of the bellows and the wall 78. This rib 90' is deformed when the seal is assembled on the shaft and the material thereof is pressed within the rectilinear confines of the thickened portion 66'. When the bellows member of Fig. 3 is employed, it will be understood that no opening such as the opening 86 is provided in the end flange 76 of the retainer 74.

In compliance with Title 35, U. S. Code, Section 112, a preferred form of the invention has been shown in the drawings and will be described herein, but it should be understood that the invention is not limited to the specific disclosure made, and that the appended claims should be construed as broadly as the prior art will permit.

Having thus described the invention, we claim:

1. In a rotary sealing device for effecting a seal between a rotatable shaft and the walls of an opening provided in a member through which the shaft extends, means providing a sealing seat on said member surrounding said opening; a sealing washer surrounding the shaft and bearing against said seat, said washer being formed with an annular recess providing a cyilndrical surface and a radially disposed rearwardly facing shoulder; a flexible sleeve surrounding said shaft and having a thickened portion at one end in sealing engagement with said shaft, a radial flange at the other end bearing against said washer, a series of bellows folds intermediate its ends, and a cylindrical portion extending between said series of folds and said radial flange; a cuplike retainer having a radial end wall provided with a central opening through which the shaft extends and a cylindrical wall; means for clamping the marginal regions of said latter opening to said shaft to establish a driving connection between the shaft and retainer; means establishing a driving connection between said retainer and the thickened portion of said sleeve; a clamping ring surrounding the cylindrical portion of said flexible sleeve and the cylindrical portion of said washer and having a forward face bearing against said radial flange; there being an annular groove formed in the cylindrical surface of said washer; resilient sealing means disposed in said groove for sealing the cylindrical surface of the washer to the inner surface of the cylindrical portion of said sleeve; spring means extending between the end wall of the retainer and said clamping ring for urging the latter against said radial flange to in turn urge the washer against said sealing seat, and interengaging means on the cylindrical wall of the retainer and washer establishing a driving connection therebetween.

2. In a rotary sealing device for effecting a seal between a rotatable shaft and the walls of an opening provided in a member through which the shaft extends, means providing a sealing seat on said member surrounding said opening; a sealing washer surrounding the shaft and bearing against said seat, said washer being formed with an annular recess providing a cylindrical surface and a radially disposed rearwardly facing shoulder; a flexible sleeve surrounding said shaft and having a thickened portion at one end in sealing engagement with said shaft, a radial flange at the other end bearing against said washer, a series of bellows folds intermediate its ends, and a cylindrical portion extending between said series of folds and said radial flange; a cup-like retainer having a radial end wall provided with a central opening through which the shaft extends and a cylindrical wall; means for clamping the marginal regions of said latter opening to said shaft to establish a driving connection between the shaft and retainer; means establishing a driving connection between said retainer and the thickened portion of said sleeve; a clamping ring surrounding the cylindrical portion of said flexible sleeve and the cylindrical portion of said washer and having a forward face bearing against said radial flange; there being an annular groove formed in the cylindrical surface of said washer; resilient sealing means disposed in said groove for sealing the cylindrical surface of the washer to the inner surface of the cylindrical portion of said sleeve; there being an internal annular groove in the thickened portion of said sleeve; resilient sealing means disposed in said groove and bearing against said shaft for sealing said thickened portion to the shaft; spring means extending between the end wall of the retainer and said clamping ring for urging the latter against said radial flange to in turn urge said washer against said sealing seat, and interengaging means on the cylindrical wall of the retainer and washer establishing a driving connection therebetween.

3. In a rotary sealing device for effecting a seal between a rotatable shaft and the walls of an opening provided in a member through which the shaft extends, the combination set forth in claim 1 wherein said means establishing a driving connection between said retainer and the thickened portion of said sleeve comprises an anchoring screw extending through a wall of the retainer and threadedly received within said thickened portion.

4. In a rotary sealing device for effecting a seal between a rotatable shaft and the walls of an opening provided in a member through which the shaft extends, the combination set forth in claim 1 wherein said means establishing a driving connection between said retainer and the thickened portion of said sleeve comprises an annular rib formed on the periphery of said thickened portion and having frictional engagement with the cylindrical wall of the retainer.

5. In a rotary sealing device for effecting a seal between a rotatable shaft and the walls of an opening provided in a member through which the shaft extends, means providing a sealing seat on said member surrounding said opening; a sealing washer surrounding the shaft and bearing against said seat, said washer being formed with an annular recess providing a cylindrical surface and a radially disposed rerwardly facing shoulder; a flexible sleeve surrounding said shaft and having a thickened portion at one end in sealing engagement with said shaft, a radial flange at the other end bearing against said washer, a deformable intermediate region and a cylindrical portion extending between said deformable intermediate region and said radial flange; a cup-like retainer having a radial end wall provided with a central opening through which the shaft extends and a cylindrical wall; means for clamping the marginal regions of said latter opening to said shaft to establish a driving connection between the shaft and retainer; means establishing a driving connection between said retainer and the thickened portion of said sleeve; a clamping ring surrounding the cylindrical portion of said flexible sleeve and the cylindrical portion of said washer and having a forward face bearing against said radial flange; there being an annular groove formed in the cylindrical surface of said washer; resilient sealing means disposed in said groove for sealing the cylindrical surface of the washer to the inner surface of the cylindrical portion of said sleeve; spring means extending between the end wall of the retainer and said clamping ring for urging the latter against said radial flange to in turn urge said washer against said sealing seat, and interengaging means on the cylindrical wall of the retainer and washer establishing a driving connection therebetween.

References Cited in the file of this patent

UNITED STATES PATENTS

| | | |
|---|---|---|
| 2,023,477 | Knebusch et al. | Dec. 10, 1935 |
| 2,337,639 | Brummer | Dec. 28, 1943 |
| 2,426,047 | Payne | Aug. 19, 1947 |
| 2,447,663 | Payne | Aug. 24, 1948 |
| 2,479,711 | Arutunoff | Aug. 23, 1949 |
| 2,504,937 | Payne | Apr. 18, 1950 |

FOREIGN PATENTS

| | | |
|---|---|---|
| 572,277 | Great Britain | 1945 |
| 653,939 | Great Britain | 1951 |

OTHER REFERENCES

An article entitled, "High Heat and Corrosion Resistant Plastic," by Everett B. Yelton in "Product Engineering Magazine" for November 1947; pages 154–158. (Copy available in Class 288–S. R.)